Patented Mar. 2, 1937

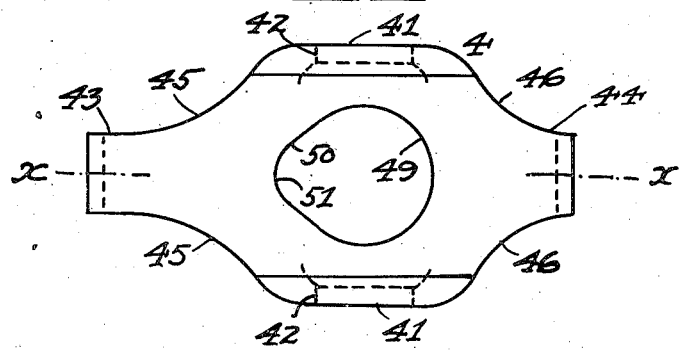
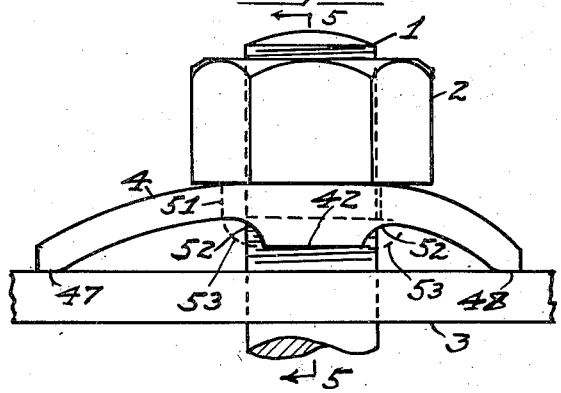
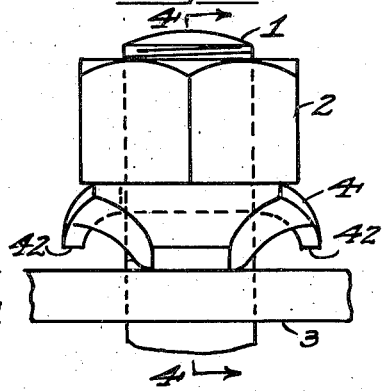
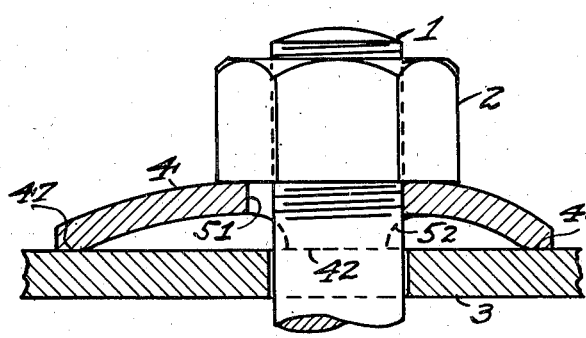
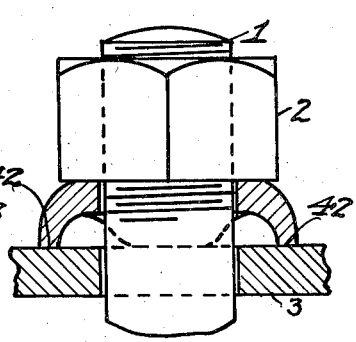

2,072,176

UNITED STATES PATENT OFFICE 2,072,176

SPRING NUT LOCK

George E. Monroe, Detroit, Mich.

Refiled for abandoned application Serial No. 743,952, September 14, 1934. This application July 8, 1936, Serial No. 89,577

6 Claims. (Cl. 151—38)

My invention relates to improvements in nut locks or spring washers more especially adapted for use in connection with railroad tracks, and its principal object is to provide a one-piece resilient locking member which, when interposed between the nut and the adjacent surface of the work to be held in place thereby, can be so compressed, by screwing down the nut, as to exert a yieldable pressure between the said nut and the said surface of such magnitude as to be capable of adequately holding the nut against unintended releasable rotation under the extreme conditions as regards impact and vibration which are present in railroad work, while at the same time having a reserve of resilient pressure to accommodate itself to expansion and contraction of the associated parts.

Another object of my said invention is to provide a spring washer of the character referred to which, when flexed, will exert, in addition to the resilient pressure along the axis of the bolt, a lateral gripping effect upon the threaded body of the bolt which operates to further secure the parts against loosening or removal.

More specifically, my improved washer is characterized in that it is of a generally arcuate elongate shape having arcuate spring end portions adapted to bear against the adjoining bolt receiving member, such as the fish plate of a railway track joint. Preferably one of these spring end portions is longer than the other. It bears against the fish plate at an acute angle as illustrated. The aperture through the washer is of a generally circular contour but tapers toward one end lengthwise of the washer whereby, upon flexure of the washer, this contracted end portion of the aperture tends to grip the bolt.

A meritorious characteristic is that the spring end portions of the washer extend from the center of the aperture therethrough to a substantially greater distance than do the side portions of the washer, and the side portions project in the direction of the curvature of the spring end portions to a substantially less distance than do the spring end portions whereby the side portions engage the adjoining surface only following flexure of the spring end portions. Such side portions are intended as stops to determine the permitted or desired amount of flexure to which the spring end portions would be subjected in the tightening of the nut on the bolt.

An important feature is that the spring end portions bear resiliently against the adjoining surfaces at an acute angle and are flattened at their points of engagement therewith so as to facilitate flexing of the washer while the side portions are provided with lugs or stops which are adapted to bear substantially thereon resiliently and perpendicularly against the adjoining surfaces.

A further object of my said invention is to provide a nut lock which is simple in construction and economical to manufacture, and at the same time so proportioned in its various parts as to be susceptible of such equality of heat treatment throughout its mass as to provide the proper and permanent resilient qualities required to meet the hard conditions of railroad service.

With these and other objects in view, a preferred form of my improved locking device will now be described with reference to the accompanying drawing, in which:

Figure 1 is a plan view of my improved spring washer,

Fig. 2 is a side elevation of the spring washer together with its associated elements as it appears before the nut is screwed down in place, Fig. 3 is an end view of the same, Fig. 4 is a longitudinal section taken on line 4—4 of Fig. 3 showing the relative positions of the parts after the nut has been screwed down in place, and Fig. 5 is a transverse section on line 5—5 of Fig. 2 showing the parts occupying the same relative positions as in Fig. 4.

Like characters designate corresponding parts throughout the several views.

Numeral 1 designates the bolt provided with the nut 2, while 3 represents a fish plate or other element to be held in place by the bolt and nut.

The numeral 4 designates my improved locking device which consists essentially of a strip of forged alloy spring steel having short, parallel, rounded edges 41 which are continued downwards so as to terminate in flanges or stops 42. Upon the median line x—x of the strip, as shown in Fig. 1, are the relatively long and short end extensions 43, 44 which are defined by concave arcuate edges 45, 46 and terminate in narrow flat surfaces 47, and 48 respectively, adapted to rest upon the outer face of the fish plate 3. Upon the median line x—x is an opening 49 which is, for the most part, of circular contour having a diameter somewhat in excess of the diameter of the bolt 1 which passes therethrough. The said opening, however, at a point upon the median line and adjacent the longer extension 43, is enlarged so as to form an angular notch 50 which terminates in a rounded portion 51 of relatively small radius, as shown more clearly in Fig. 1.

After being cut and punched to the contour shown in Fig. 1, the strip is bent about its minor axis into arcuate form, as shown in Fig. 2, as a result of which the surfaces 47, 48 rest upon the surface of the fish plate 3 while the flanges or stops 42 are spaced away from the same for a short distance which depends upon the size of the locking device and the pressure which it is desired to exert for the purpose of locking the nut in place. The amount of space between the flanges 42 and the surface of the fish plate is preferably so proportioned to the strength of the device as a whole that when the nut 2 is screwed down in place, as shown in Figs. 4 and 5, so that the flanges rest upon the surface of the fish plate, the tensile stress upon the material of the locking device will not exceed the elastic limit of the same. By this means, permanent set is avoided, notwithstanding the application of excessive loads, and at the same time the locking member as a whole is strengthened at the center and prevented from buckling or other deformation. Also, obviously, the locking device will continue to exert a continuous pressure against the underside of the nut which is sufficient to prevent rotation of the same even under the most severe conditions of expansion and contraction of the parts or of vibration due to the heaviest loads passing over the rails or other elements which the bolts are used for securing in place.

The spring end portions 43 and 44 are adapted to first contact the adjoining surfaces as shown in Figs. 2 and 3. It is only following flexure of such spring end portions that the stops 42 are brought against such surface. The relative proportion and arrangement of parts is such that these stops determine the amount of flexure it is desired to impose upon the washer. The stops bear substantially perpendicularly against the fish plate 3 as shown in Fig. 5. The spring end portions, even when first brought to bear against the side of the fish plate, bear at a substantially acute angle thereagainst whereby flexure of the washer is facilitated.

Due to the design of the locking device as herein illustrated, the bearing surface between the nut and the locking device is relatively large so that scoring of the underside of the nut is avoided. As shown in Fig. 4 substantially the entire adjacent surface of the nut is engaged by the washer. Furthermore, the flat surfaces 47 and 48 which bear against the fish plate are designed to allow free movement of the parts in contact without undue wear of the locking device or scuffing of the fish plate. The size of the opening 49 is so proportioned in relation to the diameter of the bolt that flexure of the locking device to the extent indicated in Fig. 4 will cause the sides of the notch 50 to securely grip the body of the bolt in a radial direction, thereby preventing any rotation of the bolt within the locking member, while, at the same time, the pressure exerted along the axis of the bolt effectually prevents rotation of the nut.

It will be understood from the foregoing description and by reference to the drawing that I have provided a nut lock which is simple in construction and which is capable of exerting a resilient pressure against the under surface of the nut continuously under all conditions of service, and while I have herein described and shown a preferred embodiment of my invention, it will be readily understood by those skilled in the art to which the same relates that my device may be modified in various ways to suit any particular or peculiar requirement without departing from the spirit of my invention. For example, while I have herein shown and described my improved nut lock as having relatively long and short extensions 45 and 46 which are eminently adapted for use in difficult railroad work, such as crossings for example, in which the shorter extension enables the fastening bolts to be located closer to the points of stress, I may in some cases make the said extensions of equal length. Furthermore, instead of forming the downwardly extending flanges 42 with concave arcuate ends 52, I may make the same of convex form as indicated in broken lines at 53 in Fig. 2.

What I claim is:

1. In combination with a bolt receiving element and a bolt having a nut, an arcuate elongate apertured spring washer having an arc of single curvature interposed between the nut and the bolt receiving element with the nut bearing against the convex face of the washer, said washer having a length substantially greater than its width and having one arcuate end portion of substantially greater length from the center of the aperture than the other arcuate end portion, each end portion bearing against the bolt receiving element at an acute angle, said washer having side lugs disposed on opposite sides of said aperture intermediate said end portions, said lugs being substantially shorter than said end portions and extending below the lower face of the intermediate part of the washer and adapted to contact the bolt receiving element only following flexure of the end portions thereagainst.

2. In combination with a bolt receiving element and a bolt having a nut, an arcuate apertured spring washer having an arc of single curvature interposed between the nut and the bolt receiving element with the nut bearing against the convex face of the washer, said washer having a length greater than its width, each arcuate end portion bearing against the bolt receiving element at an acute angle, and stop means disposed on opposite sides of said aperture intermediate said end portions and extending below the lower face of the intermediate part of the washer, said means being adapted to contact the bolt receiving element only following flexure of the end portions thereagainst.

3. In combination with a bolt receiving element and a bolt having a nut, an arcuate apertured spring washer having an arc of single curvature interposed between the nut and the bolt receiving element with the nut bearing against the convex face of the washer, said washer having a length substantially greater than its width, each arcuate end portion bearing against the bolt receiving element at an acute angle, and lugs disposed on opposite sides of said aperture intermediate said end portions and extending below the lower face of the intermediate part of the washer, said lugs being adapted to contact the bolt receiving element only following flexure of the end portions thereagainst.

4. In combination with a bolt receiving element and a bolt having a nut, an arcuate apertured spring washer having an arc of single curvature interposed between the nut and the bolt receiving element with the nut bearing against the convex face of the washer, the aperture in said washer being primarily circular but extended beyond its normal diameter at one portion to form a notch, said washer having a length greater than its width, each arcuate end portion bearing against the bolt receiving element at an acute angle, and stop means disposed on opposite sides of said aperture intermediate said end portions and extending below the lower face of the intermediate part of the washer, said means being adapted to contact the bolt receiving element only following flexure of the end portions thereagainst.

5. A spring washer comprising an arcuate apertured spring washer of greater length than width and having an arc of single curvature, each arcuate end portion forming an acute angle with a straight line extending from end to end of the washer, and stop means disposed on opposite sides of said aperture intermediate said end portions and extending below the lower face of the intermediate part of the washer for limiting flexure of said end portions toward the plane of the intermediate portion.

6. A spring washer comprising an arcuate apertured spring washer of greater length than width and having an arc of single curvature, each arcuate end portion forming an acute angle with a straight line extending from end to end of the washer, and stop means disposed on opposite sides of said aperture intermediate said end portions and extending below the lower face of the intermediate part of the washer for limiting flexure of said end portions toward the plane of the intermediate portion, the aperture in said washer being primarily circular but extended beyond its normal diameter at one portion to form a notch.

GEORGE E. MONROE.